US006627718B2

(12) United States Patent
Jiang et al.

(10) Patent No.: US 6,627,718 B2
(45) Date of Patent: Sep. 30, 2003

(54) POLYMERIZABLE COMPOSITIONS FOR MAKING OPTICAL LENS WITH HIGH REFRACTIVE INDEX AND HIGH ABBE NUMBER, AND RESULTING LENS

(75) Inventors: Peiqi Jiang, Kanagawa (JP); Gilles Widawski, Paris (FR); Gilbert Menduni, Tokyo (JP)

(73) Assignee: Essilor International Compagnie Generale d'Optique, Charenton cedex (FR)

( * ) Notice: Subject to any disclaimer, the term of this patent is extended or adjusted under 35 U.S.C. 154(b) by 0 days.

(21) Appl. No.: 10/225,327

(22) Filed: Aug. 21, 2002

(65) Prior Publication Data

US 2003/0109655 A1 Jun. 12, 2003

Related U.S. Application Data

(63) Continuation of application No. 09/452,740, filed on Dec. 1, 1999, now Pat. No. 6,479,606, which is a continuation of application No. PCT/FR99/00726, filed on Mar. 29, 1999.

(30) Foreign Application Priority Data

Apr. 3, 1998 (FR) .............................................. 98 04190

(51) Int. Cl.$^7$ .............................................. G08F 234/04
(52) U.S. Cl. ........................ 526/256; 526/259; 526/268; 526/281; 526/282
(58) Field of Search ................................ 526/256, 259, 526/268, 281, 282

(56) References Cited

U.S. PATENT DOCUMENTS

| 5,270,439 | A |   | 12/1993 | Maruyama et al. | .......... 528/373 |
| 5,977,276 | A | * | 11/1999 | Toh et al. | ................... 526/308 |
| 6,166,158 | A |   | 12/2000 | Toh et al. | ................... 526/308 |
| 6,172,140 | B1 |  | 1/2001 | Toh et al. | ................... 523/289 |

FOREIGN PATENT DOCUMENTS

| EP | 0394495 | 10/1990 |
| WO | WO 96/26184 | 8/1996 |
| WO | WO 96/38486 | 12/1996 |

* cited by examiner

*Primary Examiner*—Bernard Lipman
(74) *Attorney, Agent, or Firm*—Fulbright & Jaworski L.L.P.

(57) ABSTRACT

The present invention relates to polymerizable compositions for the manufacture of optical lenses with a high refractive index and a high Abbe number, and optical lenses comprising these compositions.

27 Claims, No Drawings

POLYMERIZABLE COMPOSITIONS FOR MAKING OPTICAL LENS WITH HIGH REFRACTIVE INDEX AND HIGH ABBE NUMBER, AND RESULTING LENS

This application is a continuation of U.S. application Ser. No. 09/452,740 filed Dec. 1, 1999, now U.S. Pat. No. 6,476,606, which is a continuation of international application number PCT/FR99/00726 filed Mar. 29, 1999, which claims priority to French Application No. 98/04190 filed Apr. 3, 1998.

FIELD OF THE INVENTION

The subject-matter of the present invention is novel polymerizable compositions for the manufacture of optical lenses with a high refractive index and a high Abbe number and the optical lenses, in particular ophthalmic lenses, obtained from these compositions.

The term "optical lens with a high refractive index" means an optical lens with a refractive index of greater than or equal to 1.55 and preferably greater than 1.57.

Novel polymerizable compositions according to the invention are preferably of use in the manufacture of spectacle glasses.

An ophthalmic lens with a high refractive index must have all the following characteristics:

- a high transmission (transmission generally of greater than 85% and preferably of greater than or equal to 90%), with an absence of or optionally a very low light scattering,
- a high Abbe number of greater than or equal to 30 and preferably of greater than or equal to 35, in order to avoid chromatic aberrations,
- a low yellowing index and an absence of yellowing over time,
- good impact strength (in particular according to the CEN and FDA standards),
- good suitability for various treatments (shock-proof primer, anti-glare or hard coating deposition, and the like) and in particular good suitability for colouring,
- a glass transition temperature value preferably of greater than or equal to 80° C. and better still of greater than 90° C., preferably of between 90 and 110° C.

In addition, the polymerizable compositions must also be easy to process industrially.

In particular, it is desirable for the polymerizable compositions to be able to be quickly polymerized, in particular by photopolymerization.

DESCRIPTION OF RELATED ART

Patent Document WO 96/38486 discloses polymerizable compositions for the manufacture of optical lenses with a high index and a high Abbe number comprising 20 to 60% by weight of an acrylate or methacrylate monomer derived from a polycyclic olefin, in particular an acrylate or methacrylate derivative of tricyclodecane, 15 to 60% by weight of a di- or polythiol, 5 to 50% by weight of a divinyl or polyvinyl monomer, the vinyl groups of which do not form a (meth)acrylic group, and 0 to 20% by weight of a polymerizable comonomer which can be chosen from methacrylates, acrylates, thiomethacrylates, thioacrylates, vinyls, vinyl ethers, allyls, epoxides and the like.

Although it is indicated that the polymerizable compositions of this document can be polymerized thermally and/or by UV irradiation, all the implementational examples report a thermal curing, the duration of which is particularly lengthy (8 hours).

Patent Document WO 97/44372 discloses a polymerizable composition for the manufacture of ophthalmic lenses which comprises 2.5 to 100% of a divinyl ester cyclic monomer, 5 to 30% by weight of a di- or polythiol monomer and, optionally, 1 to 40% by weight of a thiodiacrylate or -dimethacrylate monomer.

SUMMARY OF THE INVENTION

A subject-matter of the present invention is therefore a composition comprising polymerizable monomers for the manufacture of ophthalmic lenses with a high refractive index and a high Abbe number which is easily polymerizable, in particular which is easily photopolymerizable.

The composition comprising polymerizable monomers according to the invention comprises:

(A) at least one polythio(meth)acrylate monomer;
(B) at least one monomer with a high Abbe number comprising at least two polymerizable groups, preferably two to four polymerizable groups, and at least one bridged cyclic constituent unit, the bridged cyclic constituent unit or units not being bonded directly to an oxygen atom;
(C) at least one polythiol monomer; and, optionally,
(D) at least one other monomer which is copolymerizable with the monomers (A), (B) and (C), the composition being devoid of any other monomer comprising one or more vinyl functional groups, other than (meth)acrylic and thio(meth)acrylic functional groups, which is different from the monomers (B).

By definition, a thio(meth)acrylate monomer is a monomer comprising the

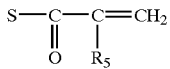

group, $R_5$ having the meaning which appears hereinbelow.

The monomer (A) is preferably a dithio(meth)acrylate.

The monomer (A) is, preferably again, an aliphatic monomer.

A first class of polythio(meth)acrylate monomers suitable for the compositions according to the invention corresponds to the formula:

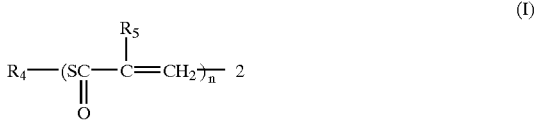

(I)

in which:

$R_4$ represents a linear or branched, monovalent or polyvalent, aliphatic hydrocarbonaceous radical or a monovalent or polyvalent, aromatic or heterocyclic group bonded directly to the sulphur atom of the thio(meth)acrylate group or groups by a nucleus or via a linear alkyl chain, it being possible for the $R_4$ radical to comprise, in its chain, one or more groups chosen from —O—, —S— or

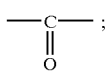

$R_5$ represents hydrogen or —$CH_3$; and $n^2$ is an integer from 1 to 6, preferably from 1 to 3.

Mention may be made, among monovalent $R_4$ radicals, of linear or branched $C_1$ to $C_5$ alkyl radicals or radicals of formula:

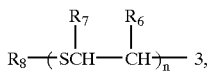

in which:

$R_6$ and $R_7$ are, independently of one another, H or a linear or branched $C_1$–$C_5$ alkyl radical;

$R_8$ is a linear or branched $C_1$–$C_5$ alkyl radical, a $C_7$–$C_{10}$ aralkyl radical or a $C_6$–$C_{12}$ aryl radical which is optionally substituted, in particular by alkyl and/or halogen groups; and $n^3$ is an integer from 1 to 4.

Mention may be made, among preferred monovalent $R_4$ radicals, of:

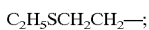

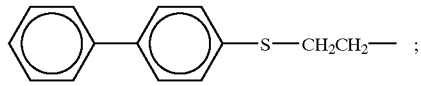

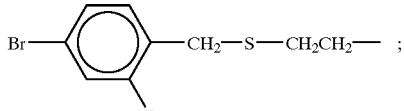

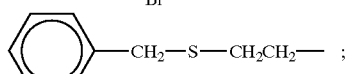

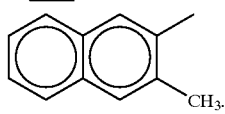

Monomers of formula (I) for which $n^2=1$ and which are as defined above are disclosed, inter alia, in Patents U.S. Pat. No. 4,606,864, JP-63316766 and EP-A-0,384,725.

Mention may be made, among divalent $R_4$ radicals coming within the context of the monomers of formula (I), of linear or branched $C_2$ to $C_{10}$ alkylene radicals which can comprise, in their chain, one or more —O—, —S— or

groups, alkylidene radicals of formula

in which $R_9$ and $R_{10}$ are $C_1$–$C_5$ alkyl radicals, radicals of formula:

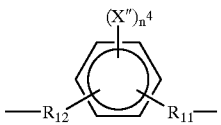

in which $R_{11}$ and $R_{12}$ are linear or branched $C_1$–$C_5$ alkylene groups which can comprise one or more —O—, —S— or

groups in their chains, X" is chosen from $C_1$–$C_5$ alkyl radicals and halogens, and $n^4$ is an integer from 0 to 4, and radicals of formula:

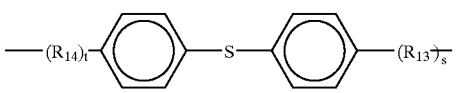

in which $R_{13}$ and $R_{14}$ are linear or branched $C_1$ to $C_5$ alkylene radicals which can comprise, in their chain, one or more —O—, —S— or

groups and t and s are equal to 0 or 1.

Mention may be made, among preferred divalent $R_4$ radicals, of the following radicals:

—$(CH_2)_{q'}$—, where q' is an integer from 1 to 8;

—$(CH_2CH_2X)_u CH_2CH_2$—, where X is —O— or —S— and u is an integer from 1 to 4;

—$(CH_2)_{u'}$—$[S(CH_2)_{v'}]_{z'}$—$(CH_2)_{w'}$—, where z' is equal to 0 or 1 and u', v' and w' are integers from 2 to 6;

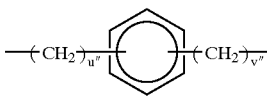

where u" and v" are integers from 1 to 4,

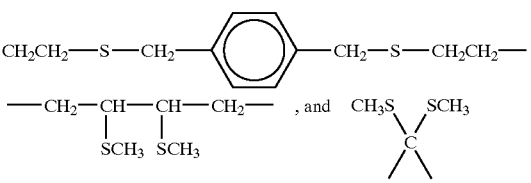

Particularly preferred divalent $R_4$ radicals are:

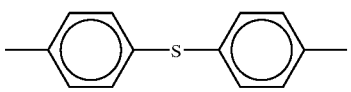

Divalent monomers of formula (I) are disclosed, inter alia, in Patents EP-A-273,661, EP-A-273,710 and EP-A-384,725.

Mention may be made, among trivalent $R_4$ radicals of the monomers of formula (I), of $C_3$ to $C_{10}$ alkyltriyl radicals which can comprise, in their chain, one or more —O—, —S— or

groups, trivalent alkylaryl radicals, the alkyl chains of which comprise one or more —S— or —O— groups, and trivalent aryl groups.

Mention may be made, among trivalent $R_4$ radicals or $R_4$ radicals with a higher valency, of:

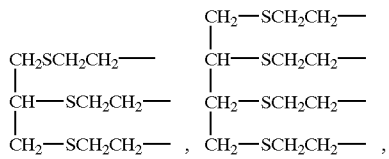

and the like.

Mention may be made, among monomers of formula (I) recommended in the present invention, of:

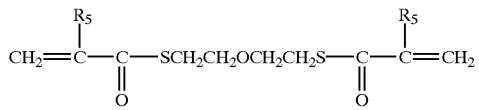

S-2-acryloyloxyethyl thio(meth)acrylate,

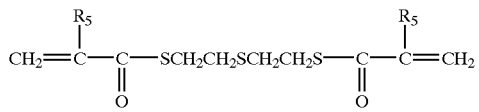

S-2-methacryloyloxyethyl thio(meth)acrylate,

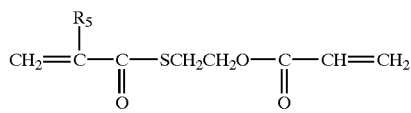

1,2-bis[(meth)acryloylthio]ethane,

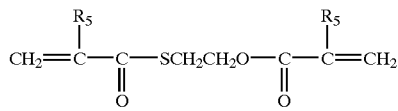

1,2-bis[(meth)acryloylthio]propane,

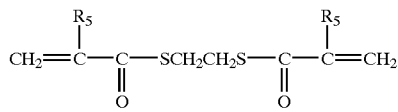

1,3-bis[(meth)acryloylthio]propane,

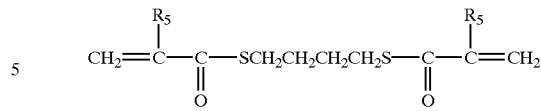

1,4-bis[(meth)acryloylthio]butane,

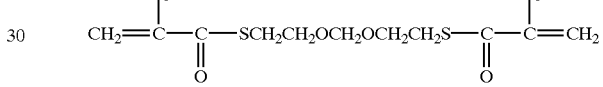

bis[2-(meth)acryloylthioethyl]ether,

bis[2-(meth)acryloylthioethyl]sulphide,

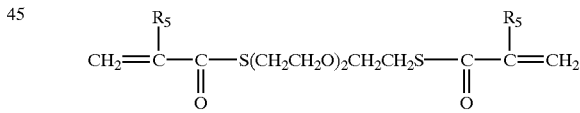

bis[2-(meth)acryloylthioethoxy]methane,

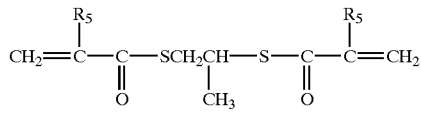

bis[2-(meth)acryloylthioethylthio]methane,

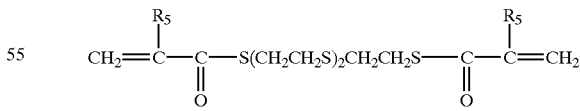

1,2-bis[2-(meth)acryloylthioethoxy]ethane,

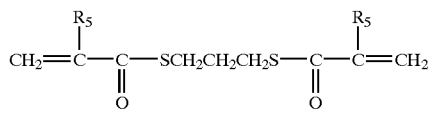

1,2-bis[2-(meth)acryloylthioethylthio]ethane,

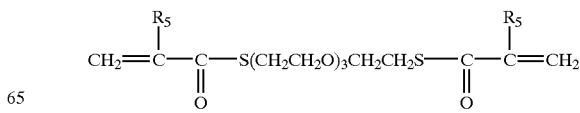

bis[2-(2-(meth)acryloylthioethoxy)ethyl]ether, $$CH_2=\underset{R_5}{C}-\underset{\underset{O}{\|}}{C}-S(CH_2CH_2S)_3CH_2CH_2S-\underset{\underset{O}{\|}}{C}-\underset{R_5}{C}=CH_2$$

bis[2-(2-(meth)acryloylthioethylthio)ethyl]sulphide, $$CH_2=\underset{R_5}{C}-\underset{\underset{O}{\|}}{C}-S-\underset{}{\bigcirc}-\underset{}{\bigcirc}-S-\underset{\underset{O}{\|}}{C}-\underset{R_5}{C}=CH_2$$

1,4-bis[(meth)acryloylthio]benzene, $$CH_2=\underset{R_5}{C}-\underset{\underset{O}{\|}}{C}-SCH_2-\underset{}{\bigcirc}-\underset{}{\bigcirc}-CH_2S-\underset{\underset{O}{\|}}{C}-\underset{R_5}{C}=CH_2$$

1,4-bis[(meth)acryloylthiomethyl]benzene, $$CH_2=\underset{R_5}{C}-\underset{\underset{O}{\|}}{C}-S-CH_2-CH_2-S-CH_2-\underset{}{\bigcirc}$$

benzylthioethyl thio(meth)acrylate, $$CH_2=\underset{R_5}{C}-\underset{\underset{O}{\|}}{C}-SCH_2\underset{SCH_3}{CH}-\underset{SCH_3}{CH}-CH_2-S-\underset{\underset{O}{\|}}{C}-\underset{R_5}{C}=CH_2$$

1,4-bis[(meth)acryloylthio]-2,3-dimethylthiobutane, $$\begin{array}{l}CH_2-S-CH_2CH_2S-\underset{\underset{O}{\|}}{C}-\underset{R_5}{C}=CH_2\\CH-S-CH_2CH_2S-\underset{\underset{O}{\|}}{C}-\underset{R_5}{C}=CH_2\\CH_2-S-CH_2CH_2S-\underset{\underset{O}{\|}}{C}-\underset{R_5}{C}=CH_2\end{array}$$

1,2,3-tris[(meth)acryloylthioethylthio]propane, and $$CH_2=\underset{R_5}{C}-\underset{\underset{O}{\|}}{C}-S-\underset{}{\bigcirc}-S-\underset{}{\bigcirc}-S-\underset{\underset{O}{\|}}{C}-\underset{R_5}{C}=CH_2$$

bis[(meth)acryloylthiophenyl]sulphide, where $R_5$ represents a hydrogen atom or a methyl group.

Another class of thio(meth)acrylic monomers suitable in the compositions comprising monomers according to the invention corresponds to the formula:

$$H_2C=\underset{R_5}{C}-\underset{\underset{O}{\|}}{C}-S-R_{15}-S-[CH_2-\underset{R_5}{CH}-\underset{\underset{O}{\|}}{C}-S-R_{15}-S]_{n^5}-\underset{\underset{O}{\|}}{C}-\underset{R_5}{C}=CH_2 \quad (II)$$

in which $R_5$ represents H or $CH_3$, $R_{15}$ represents an optionally branched $C_2$–$C_{12}$ alkylene group, a $C_3$–$C_{12}$ cycloalkylene group, a $C_6$–$C_{14}$ arylene group or a $C_7$–$C_{26}$ alkarylene group, it being possible for the carbonaceous chain of the $R_{15}$ group to be interrupted by one or more ether or thioether groups, and $n^5$ is an integer from 1 to 6.

Such monomers are disclosed in U.S. Pat. No. 5,384,379.

A recommended polythiomethacrylate monomer is bis(2-methacryloylthioethyl)sulphide (BMTES).

The polythiomethacrylate monomer or monomers generally constitute from 10 to 60% by weight, preferably 25 to 60% by weight, with respect to the total weight of polymerizable monomers present in the composition.

The monomers (B) with a high Abbe number suitable for the compositions of the invention are monomers comprising at least two, preferably two to four, polymerizable groups and at least one bridged cyclic constituent unit, the bridged cyclic constituent unit or units not being bonded directly to an oxygen atom.

The bridged cyclic constituent units are preferably chosen from norbornenyl and dicyclopentenyl radicals and their divalent hydrogenated derivatives.

The polymerizable groups are preferably (meth)acrylic or thio(meth)acrylic groups or bridged cyclic groups comprising an intracyclic ethylenic double bond or a linear or branched aliphatic residue comprising an ethylenic unsaturation, preferably a vinyl or ethylidene group bonded directly to a carbon of the ring.

The bridged cyclic polymerizable groups can be chosen from the groups of formulae:

where n is an integer from 0 to 5 inclusive, k is an integer from 0 to 3 inclusive and j is an integer from 0 to 10 inclusive, and where n is an integer from 0 to 5 inclusive, k' is an integer from 0 to 2 inclusive and j' is an integer from 0 to 10 inclusive, Q represents a —C(R')$_2$—, —O—, —S—, —NR'— or —SO$_2$— group, with R' denoting H or a $C_1$–$C_3$ alkyl radical, preferably a hydrogen atom or —CH$_3$, and R is a hydrogen atom or a $C_1$–$C_3$ alkyl radical, preferably —CH$_3$.

Mention may be made, among preferred groups above, of groups of formulae:

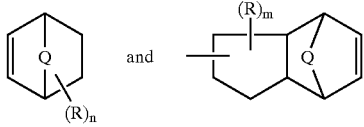

in which the R radicals represent, independently of one another, a hydrogen atom or a $C_1$–$C_3$ alkyl group, for example methyl, preferably a hydrogen atom, Q is a divalent radical chosen from —C(R')$_2$—, —O—, —S—, —SO$_2$— or —NR'—, where R' is a hydrogen atom or a $C_1$–$C_3$ alkyl radical, preferably a methyl radical, Q preferably being a —CH$_2$— radical, n=0 to 5 and m=0 to 8.

It is obvious that, when the functional groups of the monomer (B) are thio(meth)acrylate groups, the monomers (A) and (B) present in the composition are different monomers.

More preferably, a monomer with a high Abbe number is chosen, the refractive index of which is at least 1.56.

A first class of monomers (B) with a high Abbe number is composed of monomers comprising polymerizable (meth)acrylic or thio(meth)acrylic end groups comprising, in their chains, a bridged cyclic constituent unit as defined above.

Among these monomers with a high Abbe number, recommended monomers correspond to the formula:

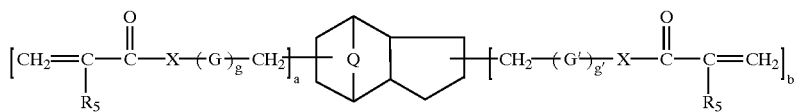
(III)

in which Q and $R_5$ are defined as above, X represents —O— or —S—, a=1–3, b=1–3, g and g' vary from 0 to 6, and G and G' are divalent groups chosen from one or more of the following groups:

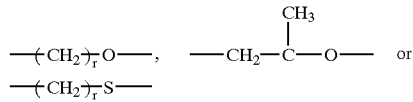

in which r=1–4.

Preferred compounds of this class are di(meth)acryloyls of hydroxymethyltricyclodecane and dithio(meth)acryloyls of hydroxymethyltricyclodecane.

A particularly recommended compound is the compound of formula:

(DCPA)

Compounds corresponding to the above formula (III) are disclosed in Patent Document WO 96/38486.

Another class of monomers (B) which is recommended are monomers comprising polymerizable bridged cyclic end groups, in particular norbornenyl and dicyclopentenyl groups.

More particularly, compounds of this class correspond to the general formula:

(IV)

in which $n^a$ is an integer from 2 to 4 and A is a radical chosen from radicals of formulae:

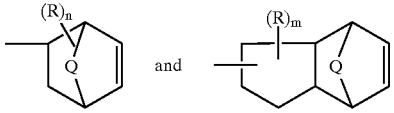

in which Q represents —C(R')$_2$—, —O—, —S—, —SO$_2$— and —NR'—, where R' represents H or a $C_1$–$C_3$ alkyl radical, R represents hydrogen or a $C_1$–$C_3$ alkyl radical, preferably $CH_3$, n=0–5 and m=0–8, and (I) when $n^a$=2, Z represents a divalent radical of a formula:

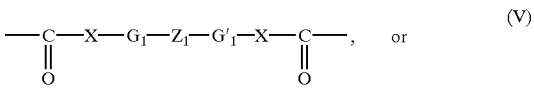
(V)

(VI)

in which formulae X represents —O— or —S—, $G_1$ and $G'_1$ are $(C_n.H_{2n}.O)_{m'}$ groups, with n'=1 to 5, preferably n'=2, and m' varies from 0 to 10, or a $C_1$–$C_5$ alkylene group, $Z_1$ is chosen from divalent radicals of formulae:

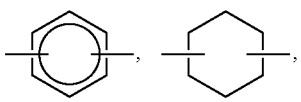

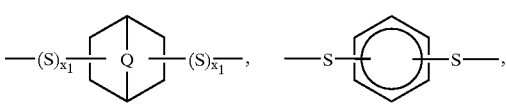

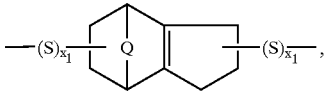

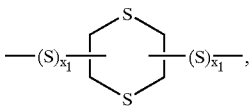

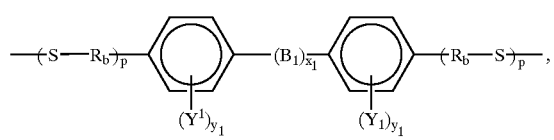

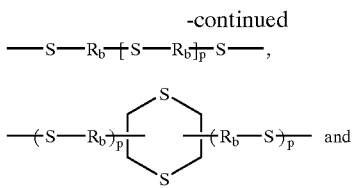

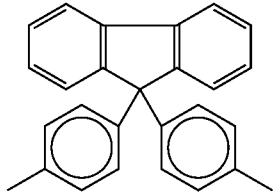

in which formulae Q is defined as above, $B_1$ represents $-C(R_2)_2-$ or $-S-$, $R_2$ is a $C_1-C_3$ alkyl radical, preferably $-CH_3$, $x_1=0$ or 1, $Y_1$ represents, independently of one another, Br, Cl or H, $y_1$ is an integer from 0 to 4, the $R_b$ groups denote, independently of one another, a $-(CH_2)_q-$ group, q is an integer from 1 to 4, preferably equal to 1 or 2, and p is an integer from 0 to 4, preferably from 0 to 2; and $Z_2$ is a divalent radical chosen from radicals of formulae:

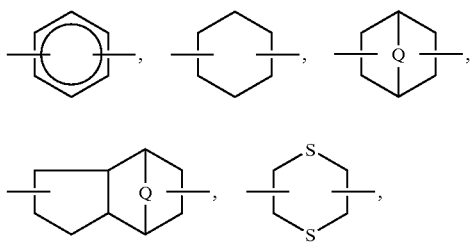

$-R_b-[S-R_b-]_p-R_b-[SR_b-]_p Z_3-[R_bS-]_p R_b-$, where Q, $R_b$ and p are defined as above and $Z_3$ is a divalent radical chosen from:

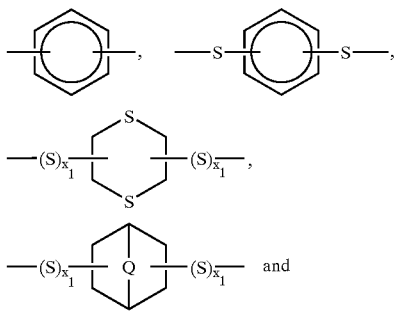

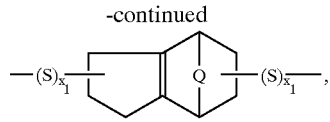

where Q and $x_1$ are defined as above;

(II) when $n^a=3$, Z represents a trivalent radical chosen from:

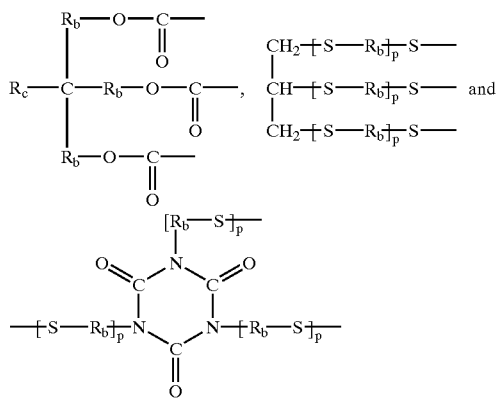

where $R_b$ and p are defined as above and $R_c$ represents H or a $C_1-C_3$ alkyl group, preferably $-CH_3$; and (III) when $n^a=4$, Z represents a tetravalent radical chosen from the following radicals:

$C-[R_3-]_4$, where $R_3$ is a $C_1-C_5$ alkylene radical or a $-[SR_b-]_p S-$ radical where $R_b$ and p are defined as above.

Preferred monomers of this class correspond to the formula:

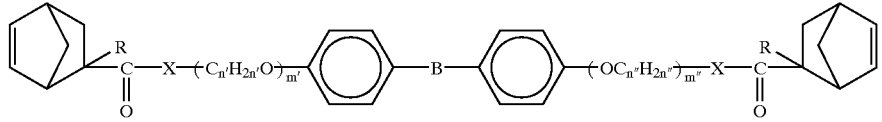

(VII)

where R is H or $CH_3$, X is $-O-$ or $-S-$, B is $-S-$ or

n' and n"=1 to 5 and m' and m" vary from 0 to 10. Preferably, $3 \leq m'+m" \leq 5$ and n' and n"=2.

A monomer of this type which is particularly recommended is the monomer of formula:

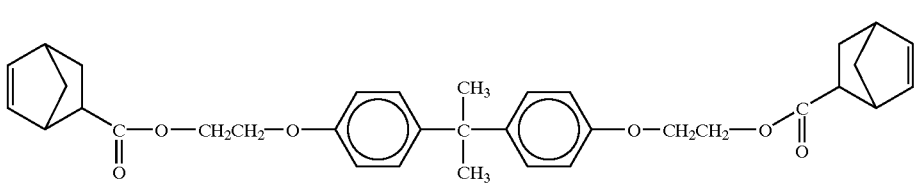

(EBPADN)

Bisphenol A 2-ethoxylate dinorbornenecarboxylate.

Polymerizable monomers of this type are disclosed, inter alia, in Patent Document WO 88/02902.

Mention may also be made, among preferred monomers comprising end polycycloalkenyl groups, of monomers of formula:

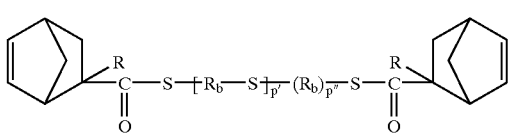

(VIII)

where R=H or CH$_3$, R$_b$ is as defined above, preferably a propylene radical, p' is an integer from 1 to 3, preferably equal to 2, and p" is an integer equal to 0 or 1.

A recommended monomer of formula (VIII) is the monomer of formula:

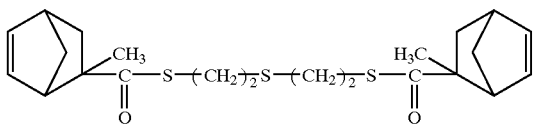

(MESDTMN) or mercaptoethyl sulphide dithiomethnorbornenecarboxylate.

Mention may be made, among monomers of formula (VI) above, of monomers in which Z$_2$ represents the following groups:

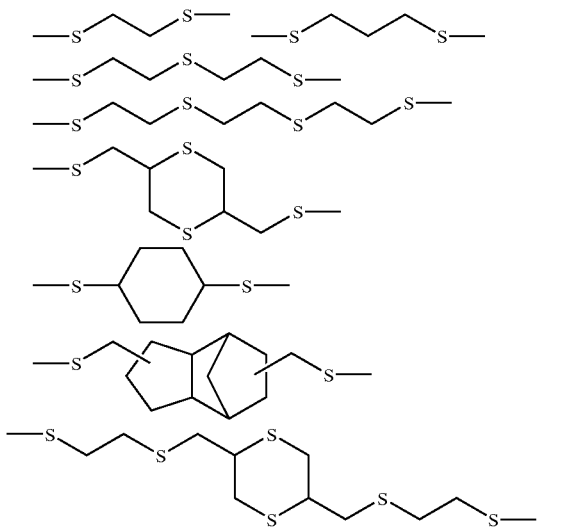

-continued

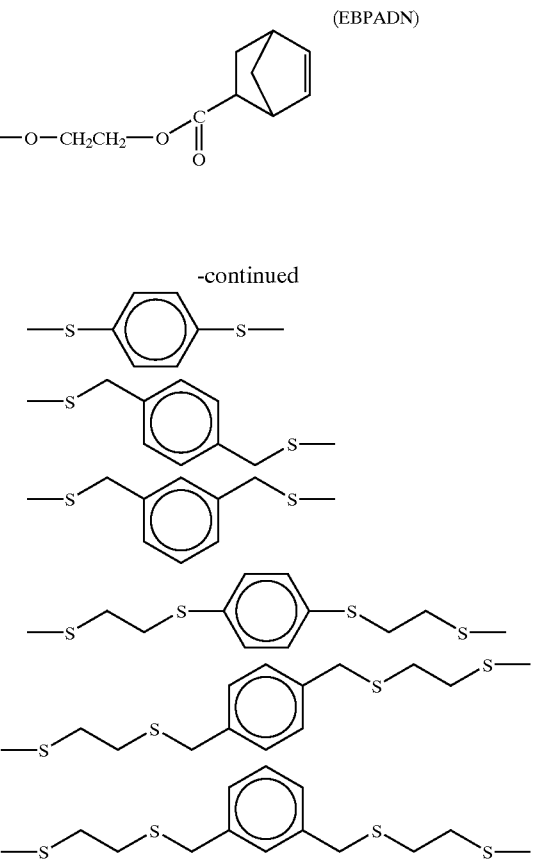

Such monomers, and the process for their preparation, are disclosed in Patent Document JP-81 51360.

Mention may be made, among recommended trivalent monomer constituents comprising end polycycloalkenyl groups, of monomers of formulae:

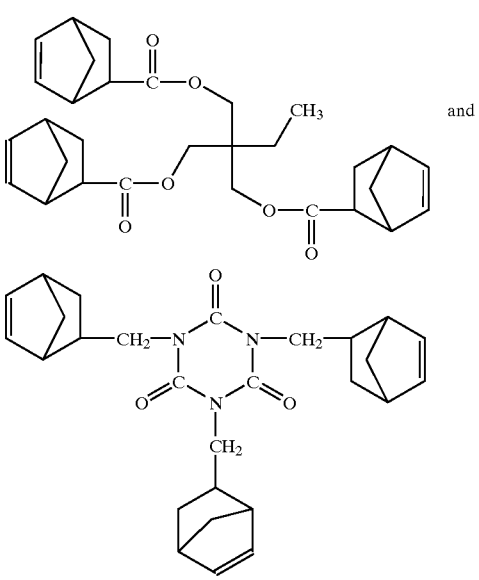

and

Polymerizable monomers (B) represent 5 to 50%, preferably 10 to 40%, by weight with respect to the total weight of polymerizable monomers present in the composition.

The third essential constituent of the compositions according to the invention is a polymerizable polythiol monomer (C).

Polythiol monomers which are suitable for the compositions according to the present invention are well known in the art and can be represented by the formula $R_1(SH)_{n^1}$ in which $n^1$ is an integer of 2 or more, preferably from 2 to 5, and $R_1$ is an aliphatic, aromatic or heterocyclic radical.

The polythiol compound is preferably a dithiol, trithiol or tetrathiol compound, in particular a polythiol with a high Abbe number.

These polythiol compounds are well known in the art and are disclosed, inter alia, in Document EP 394,495.

Mention may be made, among dithiols of use in the present invention, of 9,10-anthracenedimethanethiol, 1,11-undecanedithiol, 4-ethylbenzene-1,3-dithiol, 1,2-ethanedithiol, 1,8-octanedithiol, 1,18-octadecanedithiol, 2,5-dichlorobenzene-1,3-dithiol, 1,3-(4-chlorophenyl)propane-2,2-dithiol, 1,1-cyclohexanedithiol, 1,2-cyclohexanedithiol, 1,4-cyclohexanedithiol, 1,1-cycloheptanedithiol, 1,1-cyclopentanedithiol, 4,8-dithiaundecane-1,11-dithiol, dithiopentaerythritol, dithiothreitol, 1,3-diphenylpropane-2,2-dithiol, 1,3-dihydroxy-2-propyl 2',3'-dimercaptopropyl ether, 2,3-dihydroxypropyl 2',3'-dimercaptopropyl ether, 2,6-dimethyloctane-2,6-dithiol, 2,6-dimethyloctane-3,7-dithiol, 2,4-dimethylbenzene-1,3-dithiol, 4,5-dimethylbenzene-1,3-dithiol, 3,3-dimethylbutane-2,2-dithiol, 2,2-dimethylpropane-1,3-dithiol, 1,3-di(4-methoxyphenyl)propane-2,2-dithiol, 3,4-dimethoxybutane-1,2-dithiol, 10,11-dimercaptoundecanoic acid, 6,8-dimercaptooctanoic acid, 2,5-dimercapto-1,3,4-thiadiazole, 2,2'-dimercaptobiphenyl, 4,4'-dimercaptobiphenyl, 4,4'-dimercaptobibenzyl, 3,4-dimercaptobutanol, 3,4-dimercaptobutyl acetate, 2,3-dimercapto-1-propanol, 1,2-dimercapto-1,3-butanediol, 2,3-di-mercaptopropionic acid, 1,2-dimercaptopropyl methyl ether, 2,3-dimercaptopropyl 2',3'-dimethoxypropyl ether, 3,4-thiophenedithiol, 1,10-decanedithiol, 1,12-dodecanedithiol, 3,5,5-trimethylhexane-1,1-dithiol, 2,5-toluenedithiol, 3,4-toluenedithiol, 1,4-naphthalenedithiol, 1,5-naphthalenedithiol, 2,6-naphthalenedithiol, 1,9-nonanedithiol, norbornene-2,3-dithiol, bis(2-mercaptoisopropyl)ether, bis(11-mercaptoundecyl)sulphide, bis(2-mercaptoethyl)ether, bis(2-mercaptoethyl)sulphide, bis(18-mercaptooctadecyl)sulphide, bis(8-mercaptooctyl)sulphide, bis(12-mercaptodecyl)sulphide, bis(9-mercaptononyl)sulphide, bis(4-mercaptobutyl)sulphide, bis(3-mercaptopropyl)ether, bis(3-mercaptopropyl)sulphide, bis(6-mercaptohexyl)sulphide, bis(7-mercaptoheptyl)sulphide, bis(5-mercaptopentyl)sulphide, 2,2-bis(mercaptomethyl)acetic acid, 1,1-bis(mercaptomethyl)cyclohexane, bis(mercaptomethyl)durene, phenylmethane-1,1-dithiol, 1,2-butanedithiol, 1,4-butanedithiol, 2,3-butanedithiol, 2,2-butanedithiol, 1,2-propanedithiol, 1,3-propanedithiol, 2,2-propanedithiol, 1,2-hexanedithiol, 1,6-hexanedithiol, 2,5-hexanedithiol, 1,7-heptanedithiol, 2,6-heptanedithiol, 1,5-pentanedithiol, 2,4-pentanedithiol, 3,3-pentanedithiol, 7,8-heptadecanedithiol, 1,2-benzenedithiol, 1,3-benzenedithiol, 1,4-benzenedithiol, 2-methylcyclohexane-1,1-dithiol, 2-methylbutane-2,3-dithiol, ethylene glycol dithioglycolate or ethylene glycol bis(3-mercaptopropionate). Mention may be made, among trithiols, of 1,2,3-propanetrithiol, 1,2,4-butanetrithiol, trimethylolpropane trithioglycolate, trimethylolpropane tris(3-mercaptopropionate), pentaerythritol trithioglycolate, pentaerythritol tris(3-mercaptopropionate), 1,3,5-benzenetrithiol and 2,4,6-mesitylenetrithiol.

Mention may also be made, among polythiols of use in the compositions of the present invention, of neopentanetetrathiol, 2,2-bis(mercaptomethyl)-1,3-propanedithiol, pentaerythritol tetrakis(3-mercaptopropionate), 1,3,5-benzenetrithiol, 2,4,6-toluenetrithiol, 2,4,6-methylenetrithiol and polythiols corresponding to the formulae:

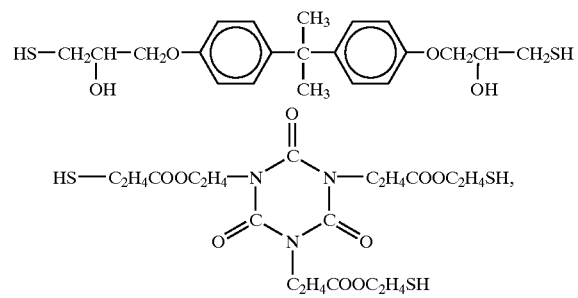

$(HSCH_2CH_2COOCH_2)_3CC_2H_5$ (TMPT), and 4-mercaptomethyl-3,6-dithia-1,8-octanedithiol.

The polythiol monomer (C) generally represents 10 to 60% by weight, preferably 20 to 50% by weight, with respect to the total weight of polymerizable monomers present in the composition.

The compositions according to the invention can also comprise other polymerizable monomers (D), with the exception of monomers comprising vinyl functional groups other than (meth)acrylate or thio(meth)acrylate groups.

Mention may be made, among these other monomers, of monomers or mixtures of monomers of formula:

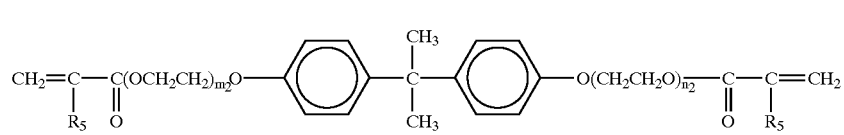

(IX)

in which $R_5$ independently represents H or $CH_3$ and $m_2+n_2$ has a mean value from 0 to 20 inclusive.

Preferred monomers of formula (IX) are compounds in which $R_5=CH_3$ and $m_2+n_2=2.6$ (EBADMA), $m_2+n_2=4$ (DBADMA) and $m_2+n_2=10$ (OBADMA).

The particularly preferred monomer is bisphenol A bis(diethoxymethacrylate) (DBADMA).

These monomers represent from 0 to 60% by weight, preferably 10 to 50% by weight, of polymerizable monomers present in the composition.

The polymerizable compositions according to the invention can also comprise additives conventionally used in polymerizable compositions for the moulding of optical articles, in particular spectacle glasses, in conventional proportions, namely inhibitors, colorants, UV absorbers, fragrances, deodorants, antioxidants and anti-yellowing absorbents.

Mention may be made, as preferred examples of antioxidizing agents, of triphenylphosphine (TPP) and Irganox® 1010 (pentaerythritol tetrakis[3-(3,5-di-tert-butyl-4-hydroxyphenyl)propionate] (CG1010).

Fragrances make it possible to mask the odour of the compositions, in particular during surface working operations.

The compositions according to the invention generally comprise polymerization initiators, preferably photoinitiators or mixtures of photoinitiators and of thermal initiators, in a proportion of 0.001 to 5% by weight with respect to the total weight of polymerizable monomers present in the composition.

Mention may in particular be made, among photoinitiators which can be used in the polymerizable compositions according to the invention, of 2,4,6-trimethylbenzoyldiphenylphosphine oxide (TPO), 1-hydroxycyclohexyl phenyl ketone, 2,2-dimethoxy-1,2-diphenylethan-1-one, alkylbenzoyl ethers, the photoinitiator sold by the Company Ciba-Geigy under the name CGI 1700, which is a 25/75 mixture of a compound of formula:

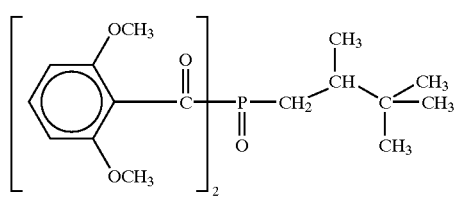

(A)

and of a compound of formula:

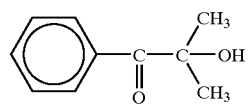

(B)

and the photoinitiator CGI 1850 sold by the Company Ciba-Geigy, which is a mixture (50/50) (by weight) of compound A and of Irgacure® 184 of formula:

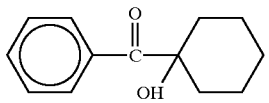

As indicated above, the preferred polymerizable compositions according to the invention are photopolymerizable compositions comprising one or more photoinitiators.

More preferably, the polymerizable compositions according to the invention are photo- and thermo-polymerizable compositions comprising both a polymerization photoinitiator and a polymerization thermal initiator.

Thermal polymerization initiators are compounds which are well known in the art and mention may be made, among them, of peroxides, such as benzoyl peroxide, cyclohexyl peroxydicarbonate, isopropyl peroxydicarbonate and t-butyl peroxy(2-ethylhexanoate).

Monomers of formula (IV) can be synthesized either by a Diels-Alder reaction between a compound comprising two or more (meth)acrylate or thio(meth)acrylate functional groups and a cycloalkene, such as cyclopentadiene or norbornadiene, or by addition of thiol/ene type between a polythiol compound and an ene compound, such as cyclopentadiene, norbornadiene, vinylnorbornene or ethylidenenorbornene.

The polythiol compound and the ene compound are reacted in proportions corresponding substantially to one thiol group of the polythiol compound or compounds per mole of ene compound.

By way of example, the scheme is shown below for the synthesis of monomers with a high Abbe number according to the invention from 5-vinyl-2-norbornene or 5-ethylidene-2-norbornene with a dithiol:

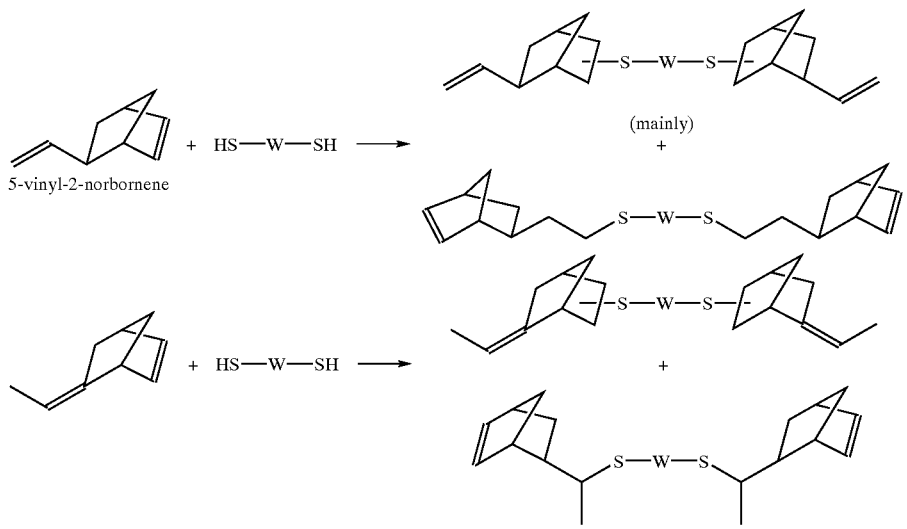

where W is an aliphatic or aromatic radical.

Examples of the synthesis of monomers of formula (IV) by the Diels-Alder reaction.

DESCRIPTION OF THE ILLUSTRATIVE EMBODIMENTS

1) Synthesis of bisphenol A 2-ethoxylate dinorbornenecarboxylate (EBPADN)

700 g of bisphenol A 2-ethoxylate diacrylate (EBPADA), Sartomer® SR 349, are introduced into a three-necked flask equipped with a mechanical stirrer, a dropping funnel for introducing reactant and a condenser. The EBPADA had a refractive index $n_D$ at 21° C. at 1.5465 and a relative density of 21° C. of 1.1478.

The acrylic monomer is then degassed by means of a roughing vacuum pump and then dinitrogen is introduced into the three-necked flask. 198 g of freshly cracked cyclopentadiene (CPD) are then added dropwise via the dropping funnel. The temperature of the reaction mixture rises as the Diels-Alder reaction between the cyclopentadiene and the diacrylate takes place. The excess cyclopentadiene is then discharged by alternating the vacuum by means of the roughing vacuum pump and the introduction of dinitrogen into the three-necked flask. Discharge of the excess cyclopentadiene is brought to completion by means of a rotary evaporator. If the presence of impurities is observed, the monomer obtained is then filtered by means of a vacuum flask.

The expected product, EBPADN, is obtained with a yield of 93.53%, this product having a molar mass of 556, a refractive index $n_D$ at 21° C. of 1.5497 and a relative density at 21° C. of 1.1569.

2) Syntheses of Trimethylolpropane Trinorbornenecarboxylate (TMPTN)

The synthesis is carried out as in the preceding synthetic example but without final discharge of the excess CPD by means of a rotary evaporator, in order to prevent the product from setting solid.

In this synthesis, use was made of 338 g of trimethylolpropane triacrylate, molar mass 296, refractive index $n_D$ at 21° C. of 1.4752 and relative density at 21° C. of 1.10067, which product is sold by the Company Cray Valley under the reference SR 351, and 217 g of cyclopentadiene were added.

The expected product, TMPTN, was obtained with a yield of greater than 95%, this product having a molar mass of 494, a refractive index $n_D$ at 21° C. of 1.511 and a relative density at 21° C. of 1.146.

3) Synthesis of Mercaptoethyl Sulphide Dithiomethnorbornenecarboxylate (MESDTMN)

The synthesis is carried as in the first synthetic example, using 211 g of bis[(2-methacryloylthio)ethyl]sulphide (BMTES); molar mass 282, $n_D$ at 21° C. 1.5745, relative density 21° C. 1.177, as starting material and 100 g of cyclopentadiene.

The expected product (MESDTMN) is obtained with a yield of greater than 95%, this product having a molar mass of 414, a refractive index $n_D$ at 21° C. of 1.5683 and a relative density at 21° C. of 1.1588.

It should be noted that the reactivity of a thiomethacrylate is much greater than that of the corresponding methacrylate (which would have required a catalyst of the Lewis acid type for the reaction).

4) Examples of Synthesis from 5-vinyl-2-norbornene and from 5-ethylidene-2-norbornene

SYNTHETIC EXAMPLE 1

12.6 g of 5-vinyl-2-norbornene (purity 95%) are introduced into a reactor equipped with a condenser, a magnetic stirrer and a nitrogen feed allowing the synthesis to be carried out under an inert atmosphere. Heating is carried out to 70° C. and 8.5 g of 2-mercaptoethyl sulphide are added over 30 minutes using a dropping funnel. During the addition, exothermicity is observed and the temperature of the reaction mixture reaches 165° C. The reaction is monitored by infrared spectroscopy until the —S—H band at 2571 cm$^{-1}$ has completely disappeared. The product exhibits a refractive index of 1.571 at 25° C.

SYNTHETIC EXAMPLE 2

The synthesis is carried out in the same way as in Synthetic Example 1, using 11.2 g of 4-mercaptomethyl-3,6-dithia-1,8-octanedithiol (purity 93%) and 15.2 g of 5-vinyl-2-norbornene. The maximum temperature reached during the addition of the thiol is 79° C. The product obtained exhibits a refractive index of 1.579 at 25° C.

SYNTHETIC EXAMPLE 3

The synthesis is carried out in the same way as in Synthetic Example 1, using 12.2 g of pentaerythritol tetrakis (3-mercaptopropionate) and 12.6 g of 5-vinyl-2-norbornene. The maximum temperature reached during the addition of the thiol is 134° C. The product obtained exhibits a viscosity of 0.48 Pa·s at 25° C. and a refractive index of 1.531 at 25° C.

SYNTHETIC EXAMPLE 4

The synthesis is carried out in the same way as in Synthetic Example 1, using 12.2 g of pentaerythritol tetrakis (3-mercaptopropionate) and 12 g of 5-ethylidene-2-norbornene (purity 99%). The maximum temperature reached during the addition of the thiol is 95° C. The product obtained exhibits a viscosity of 7.66 Pa·s at 25° C. and a refractive index of 1.5445 at 25° C.

Compositions 1 to 6 of the invention were prepared by mixing the constituents shown in Table I hereinbelow.

These compositions are subsequently cast in a two-part mould made of inorganic glass and polymerized in order to obtain ophthalmic lenses according to the invention.

The refractive index at 21° C., the Abbe number, the relative density at 21° C., the glass transition temperature, the suitability for colouring and the odour were determined with regard to these lenses.

In the following examples, except when otherwise indicated, all the parts and percentages are expressed by weight.

The percentages of adjuvants are generally expressed as percentage by weight with respect to the total weight of polymerizable monomers present in the composition.

EXAMPLES 1 TO 5 AND COMPARATIVE EXAMPLES C6 and C7

The compositions shown in Table I hereinbelow are prepared by simple physical mixing.

TABLE I

| | | Examples Compositions (Parts by weight) | | | | | | |
|---|---|---|---|---|---|---|---|---|
| | | 1 | 2 | 3 | 4 | 5 | C6 | C7 |
| (A) | BMTES | 50 | 50 | 50 | 50 | 50 | 50 | 54 |
| (B) | DCPA | 35 | 30 | 25 | 18 | 10 | — | — |
| (C) | PETG | 15 | 20 | 15 | 15 | 15 | 15 | — |
| | TMTP | — | — | — | — | — | — | 6 |
| (D) | DBADMA | — | — | 10 | 17 | 20 | 35 | 40 |
| | UV 5411 | 0.10% | 0.10% | 0.10% | 0.10% | 0.10% | 0.10% | 0.10% |
| | CG 1010 | 0.10% | 0.10% | 0.10% | 0.10% | 0.10% | 0.10% | 0.10% |
| | TPO | 0.07% | 0.07% | 0.07% | 0.07% | 0.07% | 0.07% | 0.07% |
| | Irgacure ® 184 | 0.03% | 0.03% | 0.03% | 0.03% | 0.03% | 0.03% | 0.03% |
| | Perbutyl O | 0.10% | 0.10% | 0.10% | 0.10% | 0.10% | 0.10% | 0.10% |

BMTES: Bis(2-methacryloylthioethyl)sulphide
DCPA: Diacryloyl of hydroxymethyltricyclodecane
PETG: Pentaerythritol tetrakis(thioglycolate)
TMTP: Trimethylolpropane tris(3-mercaptopropionate)

DBADMA:

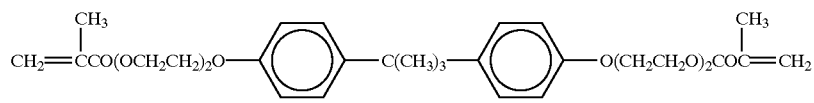

UV 5411: 2-(2-Hydroxy-5-t-octylphenyl)benzotriazole (UV absorber)
CG 1010: Pentaerythritol tetrakis[3-(3,5-di-tert-butyl-4-hydroxyphenyl)propionate] (antioxidizing agent)
TPO: 2,4,6-Trimethylbenzoyldiphenylphosphine oxide (photoinitiator)
Irgacure 184: 1-Hydroxycyclohexyl phenyl ketone (photoinitiator)
Perbutyl O: t-Butyl peroxy(2-ethylhexanoate) (thermal initiator).

Each of the mixtures is poured into a mould made of inorganic glass for ophthalmic lenses and then the moulds, thus filled, are exposed to UV irradiation.

The results of the measurements of the refractive indices, Abbe numbers and glass transition temperature (Tg) are given in Table II hereinbelow.

TABLE II

| | Examples | | | | | | |
|---|---|---|---|---|---|---|---|
| | 1 | 2 | 3 | 4 | 5 | C6 | C7 |
| Refractive index | | | | | | | |
| $n_D$ | 1.583 | 1.586 | 1.586 | 1.588 | | 1.594 | 1.593 |
| $n_E$ | 1.588 | 1.591 | 1.59 | 1.592 | | 1.599 | 1.598 |
| Abbe number | | | | | | | |
| $v_D$ | 43.58 | 44.18 | 41.9 | 43.02 | | 39.73 | 37.43 |
| $v_E$ | 43.91 | 44.5 | 42.21 | 43.34 | | 39.04 | 37.73 |
| $T_g$ | >80° C. | >80° C. | >80° C. | >80° C. | | >80° C. | >80° C. |

EXAMPLES 8 to 10

The following compositions shown in Table III hereinbelow are prepared.

TABLE III

| | | Compositions (parts by weight) | | |
|---|---|---|---|---|
| | | 8 | 9 | 10 |
| (A) | BMTES | 50 | 20 | 30 |
| (B) | EBPADN | 30 | 30 | 30 |
| (C) | DMDS | 20 | — | 10 |
| | MDO | — | 50 | 30 |
| | CGI 1850 | 0.15% | 0.15% | 0.15% |
| | TBPEH | 0.1% | 0.1% | 0.1% |
| | UV 5411 | 0.07% | 0.07% | 0.07% |

EBPADN: Bisphenol A 2-ethoxylate dinorbornenecarboxylate
DMDS: Dimercaptodiethyl sulphide
MDO: 4-Mercaptomethyl-3,6-dithia-1,8-octanedithiol
CGI 1850: 50/50 mixture of 1-hydroxycyclohexyl phenyl ketone and of $$\left( \begin{array}{c} CH_3 \\ \phantom{X} \\ CH_3 \end{array} \right)_2 \overset{O}{\underset{O}{\parallel}} C - P - CH_2 - \overset{CH_3}{\underset{\phantom{X}}{CH}} - C(CH_3)_3$$

TBPEH: t-Butyl peroxy(2-ethylhexanoate).

The polymerizable mixtures 8 to 10 are poured into a mould made of inorganic glass for ophthalmic lenses and then the moulds, thus filled, are exposed to UV irradiation.

The results of the measurements of refractive index, Abbe number, relative density and glass transition temperature (Tg) are shown in Table IV hereinbelow.

TABLE IV

| | Examples | | |
|---|---|---|---|
| | 8 | 9 | 10 |
| $n_D$ | 1.602 | 1.631 | 1.623 |
| $v_D$ | 42 | 39 | 38 |
| $d_{21}$ | 1.22 | 1.25 | — |
| $T_g$ (° C.) | 89 | 90 | 75 |

TABLE IV-continued

| | Examples | | |
|---|---|---|---|
| | 8 | 9 | 10 |
| Colourability | Yes | Yes | Yes |
| Odour | No | No | No |

EXAMPLES 11 to 13

The compositions shown in Table V hereinbelow were formulated as above.

The results of measurements of refractive index, Abbe number, relative density and glass transition temperature, as well as of a test of exposure to sunlight for lenses moulded from these compositions, have also been shown in Table V.

TABLE V

| | Examples | | |
|---|---|---|---|
| | 11 | 12 | 13 |
| BMTES | 46 | 26 | 40 |
| 80 N | 22 | 23 | — |
| DCP | — | 30 | — |
| DCPA | 12 | — | 40 |
| PETG | 20 | — | — |
| PDT | — | 20 | 20 |
| TPO | 0.1% | 0.1% | 0.1% |
| Irgacure ® 184 | 0.1% | 0.1% | 0.1% |
| Thermal catalyst | 0.1% | 0.1% | 0.1% |
| $n_E$ | 1.5967 | 1.5945 | 1.6002 |
| $n_D$ | 1.5917 | 1.5986 | 1.5955 |
| $v_E$ | 40 | 41 | 42 |
| $v_D$ | 39 | 40 | 41 |
| Relative density | 1.3 | 1.24 | 1.27 |
| Yellowing index (YI) | 0.6 | 0.7 | 0.8 |
| $T_g$ | >80° C. | >80° C. | >80° C. |
| Test of exposure to sunlight | Good | Good | Good |

80 N: BPE-80 N monomer, sold by the Company Shin Nakamura, of formula:

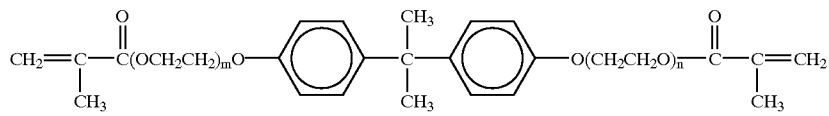

in which the mean value of m + n = 2.6.
PDT: $C(CH_2SCH_2CH_2SCH_2CH_2SH)_4$
DCP: Dimethacrylate of hydroxymethyltricyclodecane.

The yellowing index was measured according to ASTM Standard D 1425-63.

The test of exposure to sunlight consists of subjecting test specimens for 200 hours to exposure to sunlight under the same conditions with a Suntest Hanau device emitting radiation of 24.4 W/m² in the 300–400 nm spectral region and in measuring the yellowing index (YI) before and after irradiation. The test is regarded as positive (Good) if the difference in YI is less than or equal to 1.

Measurement of the Colourability

The measurement given is the value of the transmission, measured in the visible region, of a glass with a centre thickness of 2 mm coloured by steeping in an aqueous bath at 94° C., in which bath is dispersed a red pigment "Disperse Red 13" from the Company Eastman Kodak.

The Tg is measured by DMA (Dynamic mechanical analysis) on a flat test specimen of 5.2 cm×1 cm×2 mm (thickness).

The test is carried out in 3-point bending.

Tg corresponds to the maximum of the ratio $$\frac{E'' \;\; (loss\; modulus)}{E' \;\; (storage\; modulus)}.$$

Generally, unless otherwise indicated, all the tests were carried out oh samples with a thickness of 2 mm.

What is claimed is:

1. A composition comprising polymerizable monomers, comprising:
   (a) at least one polythio(meth)acrylate monomer;
   (b) at least one monomer with a high Abbe number comprising at least 2 polymerizable groups which are bridged cyclic units comprising an intracyclic ethylenic double bond or a linear or branched aliphatic residue comprising an ethylenicunsaturation directly bonded to a carbon of the ring; and
   (c) at least one polythiol monomer; and optionally,
   (d) at least one other monomer which is copolymerizable with the monomers (a), (b) and (c);
   wherein the composition is devoid of any monomer comprising one or more vinyl functional groups, other than (meth)acrylic and thio(meth)acrylic functional groups, which is different from the monomer (b).

2. The composition of claim 1, wherein the monomer (a) is dithio(meth)acrylate.

3. The composition of claim 1, wherein the monomer (a) has the formula:

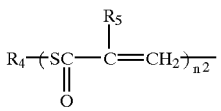

in which:

R$_4$ represents a linear or branched, monovalent or polyvalent, aliphatic hydrocarbonaceous radical or a monovalent or polyvalent, aromatic or heterocyclic group bonded directly to the sulphur atom of the thio(meth)acrylate group or groups by a nucleus or via a linear alkyl chain, it being possible for the R$_4$ radical to comprise, in its chain, one or more groups chosen from:

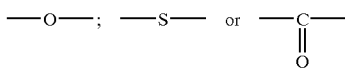

R$_5$ represents hydrogen or —CH$_3$; and n$^2$ is an integer from 1 to 6.

4. The composition of claim 3, wherein n$^2$ is an integer from 1 to 3.

5. The composition of claim 1, wherein the monomer (a) is bis(2-methacryloythioethyl)sulphide (BMTES).

6. The composition of claim 1, wherein the monomer (a) constitutes 10 to 60% by weight, with respect to the total weight of polymerizable monomers present in the composition.

7. The composition of claim 1, wherein the monomer (a) constitutes 25 to 60% by weight, with respect to the total weight of the composition.

8. The composition of claim 1, wherein the polymerizable groups of the monomer (b) are chosen from groups of formula:

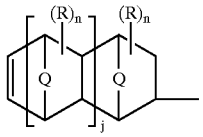

where n is an integer from 0 to 5 inclusive, k is an integer from 0 to 3 inclusive and j is an integer from 0 to 10 inclusive, and

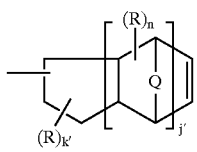

where n is an integer from 0 to 5 inclusive, k' is an integer from 0 to 2 inclusive and j' is an integer from 0 to 10 inclusive, Q represents a —C(R')$_2$—, —O—, —S—, —NR'— or —SO$_2$— group, with R' denoting H or a C$_1$–C$_3$ alkyl radical, and R is a hydrogen atom or a C$_1$–C$_3$ alkyl group.

9. The composition of claim 1, wherein the polymerizable groups of the monomer (b) are chosen from groups of formula:

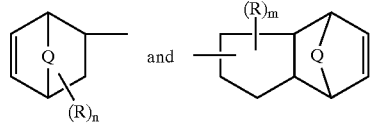

in which the R radicals represent, independently of one another, H or a C$_1$–C$_3$ alkyl group, Q is a divalent radical chosen from —C(R')$_2$—, —O— —S—, —SO$_2$— or —NR'—, where R' is a hydrogen atom or a C$_1$–C$_3$ alkyl radical, n is an integer from 0 to 5 and m is an integer from 0 to 8.

10. The composition of claim 9, wherein the monomer (b) corresponds to the general formula:

in which n$^a$ is an integer from 2 to 4 and A is a radical chosen from radicals of formula:

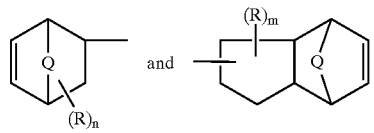

in which Q, R, m and n are as defined in claim 8, and (I) when n$^a$=2, Z represents a divalent radical of formula:

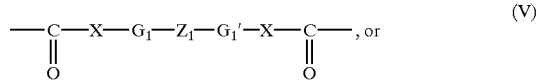

in which formula X represents —O— or —S—, G$_1$ and G'$_1$ are

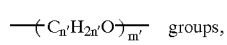 groups, with n'=1 to 5 and m' varies from 0 to 10, or a C$_1$–C$_5$ alkylene group, Z$_1$ is chosen from divalent radicals of formula:

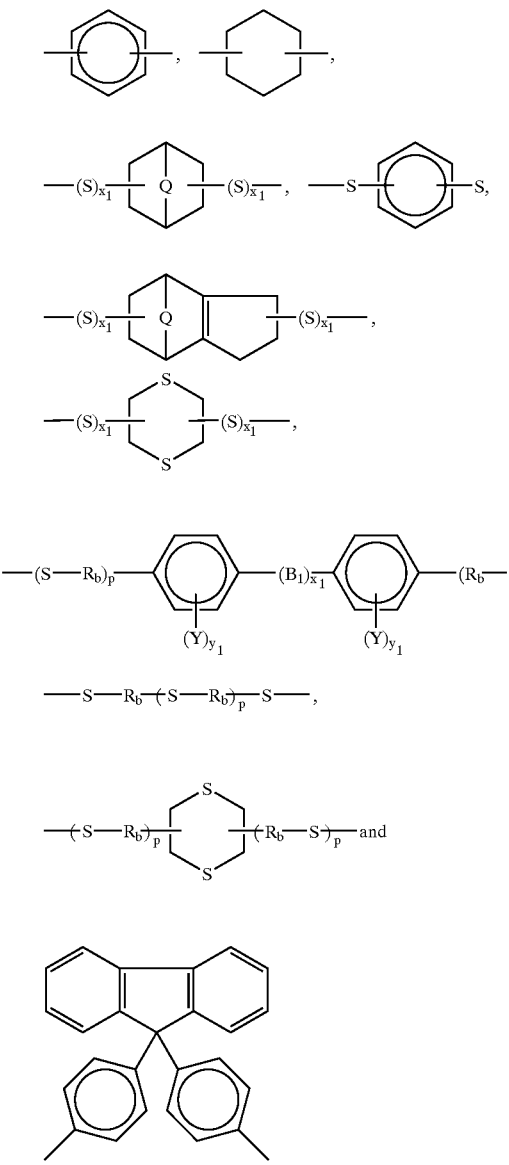

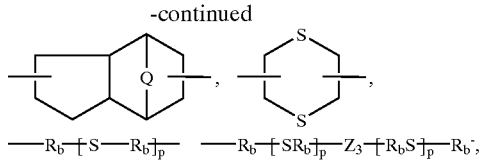

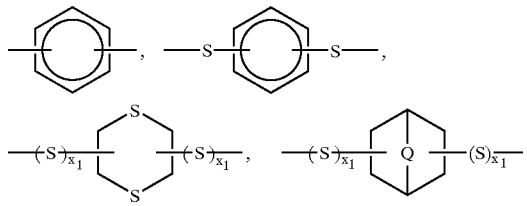

where Q, $R_b$ and p are defined as above and $Z_3$ is a divalent radical chosen from:

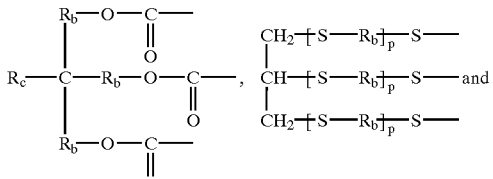

and

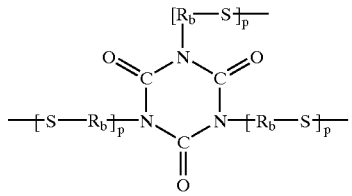

where Q and $X_1$ are defined as above, (II) when $n^a=3$, Z represents a trivalent radical chosen from:

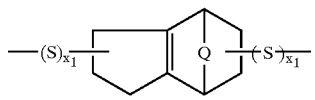

in which formula Q is defined as above, $B_1$ represents $-C(R_2)_2-$ or $-S-$, $R_2$ is a $C_1$–$C_3$ alkyl radical, $x_1=0$ or 1, $y_1$ represents, independently of one another, Br, Cl or H, $y_1$ is an integer from 0 to 4, $R_b$ is a

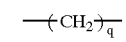

q is an integer from 1 to 4, and p is an integer from 0 to 4; and $Z_2$ is a divalent radical chosen from radicals of formula:

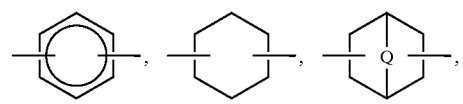

where $R_b$ and p are defined as above and $R_c$ represents H or a $C_1$–$C_3$ alkyl group, and (III) when $n^a=4$, Z represents a tetravalent radical chosen from the following radicals:

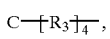

where $R_3$ is a $C_1$–$C_5$ alkylene radical or a

radical where $R_b$ and p are defined as above.

11. The composition of claim 10, wherein the monomer (b) has the formula:

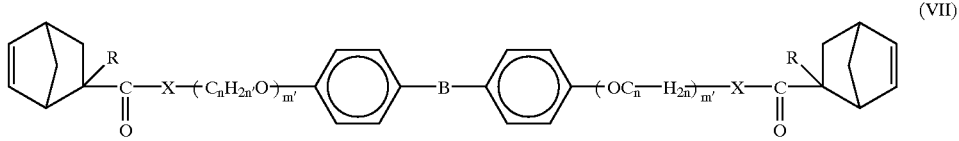

in which X represents —O— or —S—, n' and n"=1 to 5 and m' and m" vary from 0 to 10.

12. The composition of claim 11, wherein the monomer (b) has the formula:

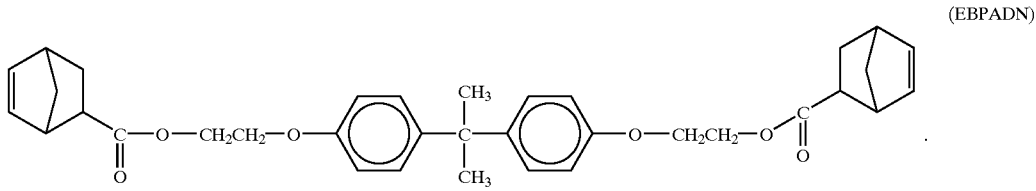

13. The composition of claim 10, wherein Q is —CH$_2$—.

14. The composition of claim 1, wherein the monomer (b) represents 5 to 50% by weight with respect to the total weight of monomers (a), (b), (c) and (d) present in the position.

15. The composition of claim 14, wherein the monomer (b) represent 10 to 40% by weight.

16. The composition of claim 1, wherein the polythiol monomer (c) has the formula $R_1(SH)_n^1$, in which $n_1$ is an integer of 2 or more, and $R_1$ is an aliphatic or aromatic radical.

17. The composition of claim 16, characterized in that the polythiol monomer (c) represents 10 to 60% by weight with respect to the total weight of polymerizable monomers present in the composition.

18. The composition of claim 17, wherein the polythiol monomer (c) represents 20 to 50% weight.

19. The composition of claim 1, wherein the other copolymerizable monomers (d) are chosen from monomers of formula:

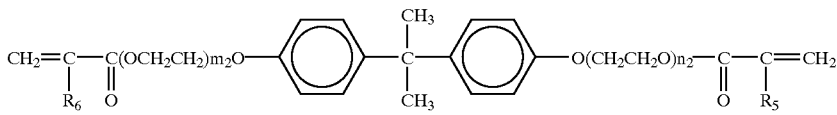

in which $R_5$ represents H or CH$_3$ and $m_2+n_2$ has a mean value from 0 to 20 inclusive.

20. The composition of claim 1, wherein the other copolymerizable monomers (d) represent 0 to 60% by weight of polymerizable monomers present in the composition.

21. The composition of claim 20, wherein the other copolymerizable monomers (d) represent 10 to 50% by weight.

22. The composition of claim 1, wherein the bridged cyclic constituent units are selected from the group consisting of norbornenyl and dicyclopentenyl radicals and their divalent hydrogenated derivatives.

23. The composition of claim 1, wherein the linear or branched aliphatic residue is a vinyl or ethylidene group directly bonded to a carbon of the ring.

24. The composition of claim 1, wherein the bridged cyclic units are not directly linked to an oxygen atom.

25. An optical lens obtained by polymerization of a composition comprising polymerizable monomers, comprising:
   (a) at least one polythio(meth)acrylate monomer;
   (b) at least one monomer with a high Abbe number comprising at least 2 polymerizable groups which are bridged cyclic units comprising an intracyclic ethylenic double bond or a linear or branched aliphatic residue comprising an ethylenic insaturation directly bonded to a carbon of the ring; and
   (c) at least one polythiol monomer; and optionally,
   (d) at least one other monomer which is copolymerizable with the monomers (a), (b) and (c);
wherein the composition is devoid of any monomer comprising one or more vinyl functional groups, other than (meth)acrylic and thio(meth)acrylic functional groups, which is different from the monomer (b).

26. The optical lens of claim 25, wherein the lens is an ophthalmic lens.

27. The optical lens of claim 26, wherein the lens is a spectacle glass.

* * * * *

UNITED STATES PATENT AND TRADEMARK OFFICE
CERTIFICATE OF CORRECTION

PATENT NO.      : 6,627,718 B2                                Page 1 of 1
DATED           : September 30, 2003
INVENTOR(S)     : Jiang et al.

It is certified that error appears in the above-identified patent and that said Letters Patent is hereby corrected as shown below:

Column 24,
Line 44, delete "ethylenicunsaturation" and insert -- ethylenic unsaturation -- therefor.

Column 29,
Line 32, delete "position" and insert -- composition -- therefor.

Signed and Sealed this

Ninth Day of December, 2003

JAMES E. ROGAN
*Director of the United States Patent and Trademark Office*